United States Patent [19]

Yoe et al.

[11] Patent Number: 4,798,455

[45] Date of Patent: Jan. 17, 1989

[54] USER RECONFIGURABLE NOVELTY GLASSES

[75] Inventors: Craig S. Yoe, Dundee; Michael R. Gibson; Dennis J. O'Patka, both of Chicago; Wayne A. Kuna, River Forest, all of Ill.

[73] Assignee: Marvin Glass & Associates, Chicago, Ill.

[21] Appl. No.: 152,446

[22] Filed: Feb. 5, 1988

[51] Int. Cl.⁴ ............................................. G02C 11/02
[52] U.S. Cl. .................................... 351/51; 351/158; 351/52
[58] Field of Search .................... 351/51, 52, 44, 156, 351/105, 158

[56] References Cited

U.S. PATENT DOCUMENTS 4,756,612  7/1988  Hyman .................................. 351/44

Primary Examiner—Rodney B. Bovernick
Assistant Examiner—P. M. Dzierzynski
Attorney, Agent, or Firm—John S. Pacocha

[57] ABSTRACT

User reconfigurable novelty glasses include separate eye frames and separate temple pieces that may be readily combined with each other and with other separate eye frames and separate temple pieces by the user to form a variety of outrageously designed novelty sunglasses. Each eye frame may be used for either the user's right or left eye and each temple piece may be used over either the user's right or left temple and ear. Eye frame designs include simulated representations of a watch, a television set, a box of popcorn, a grand piano and the like, while the temple pieces include simulated representations of a lighting bolt, a pencil, a toothbrush and the like.

4 Claims, 1 Drawing Sheet

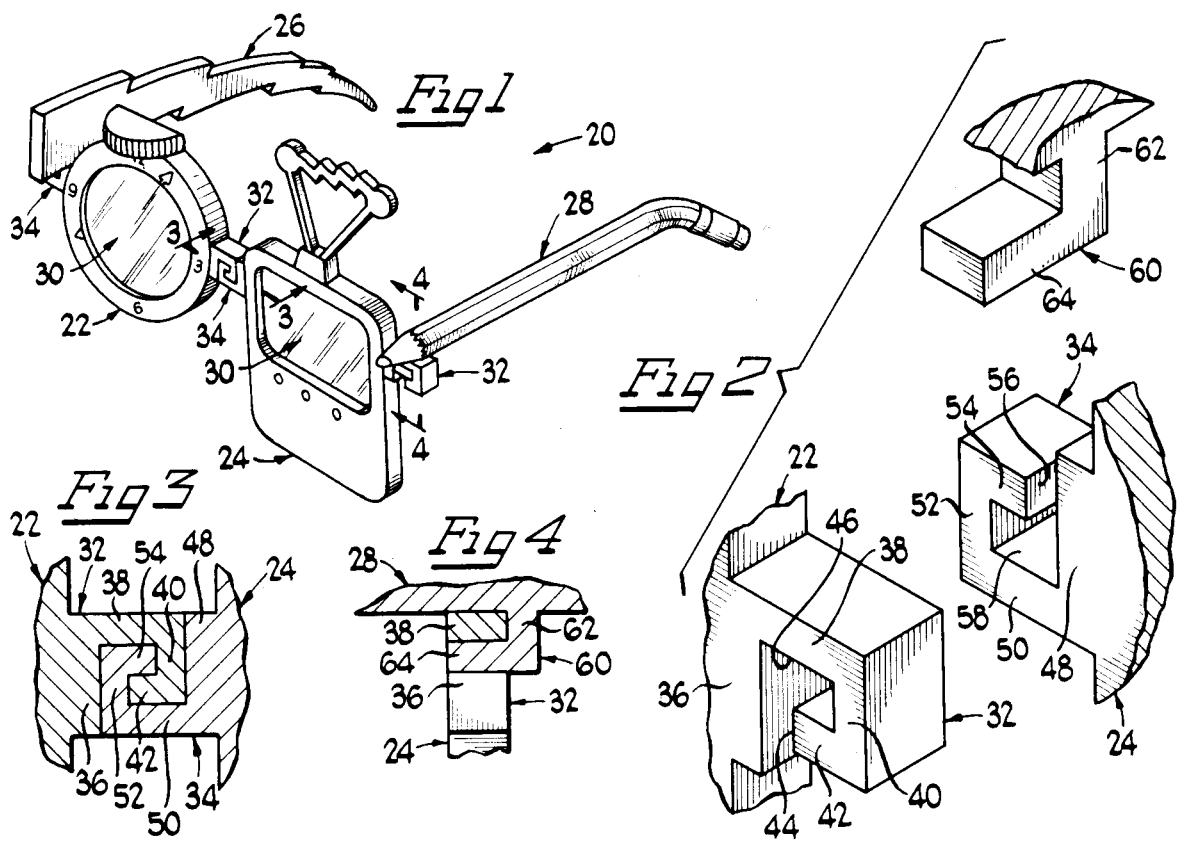
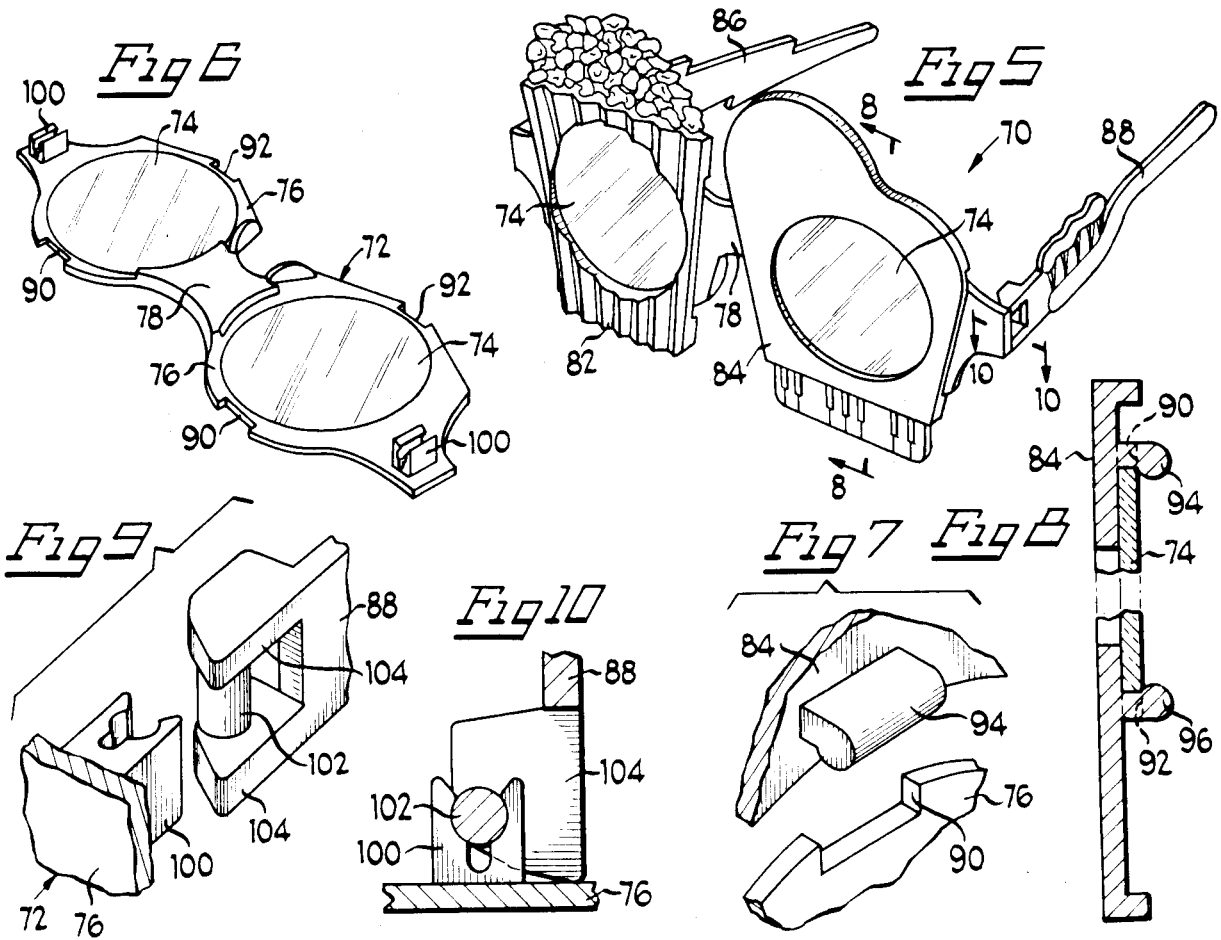

USER RECONFIGURABLE NOVELTY GLASSES

BACKGROUND OF THE INVENTION

1. Field of the Invention

This invention relates generally to novelty glasses and more particularly to novelty glasses with parts that may be recombined by the user to form different styles.

2. Background Art

Adults and children alike enjoy novelty glasses, particularly sunglasses, and the prior art is replete with novel, including some outrageous, designs. For example, giant oversized sunglasses known as Super Specs were popular in the 1960's. Another prior art example of novelty glasses, although not sunglasses, is shown in Rosenwinkel, et al., U.S. Pat. No. 4,283,127, issued Aug. 11, 1981. Nevertheless, there remains a need for novelty glasses, particularly ones made of separate pieces that may be combined by the user to form a variety of outrageous designs

SUMMARY OF THE INVENTION

This invention is concerned with providing separate eye frames and separate temple pieces that may be readily combined with each other and with other separate eye frames and separate temple pieces, by the user, to form a variety of outrageously designed novelty sunglasses. Each eye frame may be used for either the user's right or left eye and each temple piece may be used over either the user's right or left temple and ear.

BRIEF DESCRIPTION OF THE DRAWINGS

For a better understanding of the present invention, reference may be had to the accompanying drawings in which:

FIG. 1 is a perspective view of an embodiment of the present invention;

FIG. 2 is an enlarged scale, fragmentary perspective view of some of the connecting parts;

FIG. 3. is a fragmentary sectional view through the bridge connection of two eye frames taken generally along line 3—3 of FIG. 1;

FIG. 4 is a fragmentary sectional view through the connection of an eye frame and a temple piece taken generally along line 4—4 of FIG. 1;

FIG. 5 is a perspective view of an alternative embodiment of the present invention;

FIG. 6 is a perspective view showing the inside of a common lens piece;

FIG. 7 is a fragmentary perspective view showing the connection of an eye frame with the common lens piece;

FIG. 8 is a sectional view through an eye frame connected to the common lens piece taken generally along line 8—8 of FIG. 5;

FIG. 9 is a fragmentary sectional view showing the connection of a temple piece with the common lens piece; and FIG. 10 is a sectional view through a temple piece connected with the common lens piece taken generally along line 10—10 of FIG. 5.

BRIEF DESCRIPTION OF THE PREFERRED EMBODIMENTS

Referring now to the drawings in which like parts are designated by like reference numerals throughout the several views, FIG. 1 shows novelty sunglasses 20 with a clock or watch right eye frame 22, a television left eye frame 24, a lighting bolt right ear temple piece 26 and a bent pencil left ear temple piece 28. Each eye frame 22 and 24 contains a tinted plastic sunglass lens 30.

In addition to the forms or styles shown in FIGS. 1 and 6, the eye frames may comprise three dimensional stylized representations of a baseball and glove, a tennis racket and ball, a dinosaur, a milk shake, ice cream bars, a telephone, a roller skate, a pretzel, a slice of melon, a radio, a camera, french fries, a guitar, an ice cream sundae, a sandwich, a bird, a palm tree, a fried egg, a piece of cheese, or virtually any other object. Ear and temple pieces, in addition to those illustrated in FIGS. 1 and 5 may be in the form of a comb, a saxophone, a fish, watch and band, a standing flamingo, an umbrella, a zipper, a pretzel, a paintbrush, a wrench or numerous other three dimensional stylized representations. Combinations of such eye frames and temple pieces result in truly outrageous novelty sunglasses.

Each of the eye frames 22 and 24 has, as viewed in FIG. 1, a right side clip 32 and a left side clip 34 that are substantially mirror images of each other extending laterally from the eye frame. Clip 32 has a portion 36 abutting the side of the eye frame with a lateral outward projection 38 extending out from the top of abutting portion 36. There is then a downward extension 40 that is substantially parallel to and spaced from abutting portion 36 plus a final inward extension 42 that goes back toward abutting portion 36 but does not meet it, leaving a gap 44. In addition, portions 36, 38, 40 and 42 define a slot 46 extending through clip 32. Portions 36, 38, 40 and 42 are, as is best illustrated in FIGS. 2 and 3, all of the same thickness. The width of gap 44 and the height of slot 46 are each equal to the thickness of those portions.

Similarly, clip 34 has an abutting portion 48, a lateral outward extension 50 extending out from the bottom of abutting portion 48, an upwardly extension 52 and a final inward extension 54 again leaving a gap 56 equal to the thickness of the portions and a slot 58 as high as the thickness of those portions. Thus, as is again best illustrated in FIGS. 2 and 3, clips 32 and 34 slide together to form a bridge portion for the nose of the user of the sunglasses. The connection between clips 32 and 34 will withstand lateral tension and compression as well as torsion.

Each temple or piece such as 26 and 28 has an L-shaped clip 60 projecting downwardly and forwardly of the temple piece. L-shaped clip 60 has a portion 62 substantially transverse to the length of the temple piece and a forwardly extending portion 64 that is substantially parallel to the length of the temple piece. Forwardly extending portion 64 is of the same width as the length of each of portions 42 or 54 and extension 64 is as thick as each of the portions of clips 32 and 34. Accordingly, as is best illustrated in FIGS. 2 and 4, temple piece clip 60 may be connected to either clip 32 or 34 of an eye frame. More particularly, extension 64 of clip 60 will readily fit into slot 46 or 58 of clip 32 or 34, respectively.

It will be appreciated that eye frames 22 and 24 may be exchanged with each other so that eye frame 24 is over the user's right eye and eye frame 22 is over the user's left eye. Likewise, temple pieces 26 and 28 may be exchanged with each other so that temple piece 26 is over the user's left ear and temple piece 28 is over the user's right ear. Additionally, any other eye frame having clips 32 and 34 and any temple piece having an L-shaped clip 60 may be readily combined by the user to form a pair of novelty sunglasses of an entirely different design.

FIGS. 5-10 show an embodiment of the present invention in which a pair of novelty sunglasses 70 have a common lens piece 72. A pair of tinted lenses 74 are each surrounded by a peripheral portion 76 that includes a central bridge 78 for the user's nose. Connected to common lens piece 72 is a popcorn box right eye frame 82, a grand piano left eye frame 84, a lighting bolt right temple piece 86 and a tooth brush left temple piece 88.

In the upper periphery of lens piece 72 there is a notch 90 centered about the diameter through each lens 74 that is substantially perpendicular to the diameter through both lenses 74. Below notch 90, centered about the same diameter as notch 90, is a narrower notch 92 in the lower periphery of the common lens piece. On each eye frame 82 and 84, as well as any other eye frames useable with this embodiment, there are upper and lower spaced apart detents 94 and 96, respectively. Detent 94 is wider and fits into notch 90, while detent 96 is narrower and fits into notch 92. Because of the different widths of the upper and lower notches and their mating detents, the eye frames are keyed to preclude upside down attachment to lens piece 72.

There is an inherently biased split clip 100 on the inner face of the peripheral portion outside of each lens. Biased split clips 100 each receive a cylindrical pin 102 carried between two prongs 104 at the temple piece end that is opposite the end that fits over the user's ear. Thus, temple pieces 86 and 88 are each hingedly connected to the common lens piece to which eye frames 82 and 84 are attached. In order to interchange temple pieces 86 and 88, they are turned over. Any other temple piece carrying a cylindrical pin as in this embodiment may be combined to form novelty sunglasses of an outrageous design.

While particular embodiments of the present invention have been shown described, changes and modifications will occur to those skilled in the art. It is intended in the appended claims to cover all such changes and modifications as fall within the true spirit and scope of the present invention.

What is claimed as new and desired to be secured by Letters Patent is:

1. User reconfigurable novelty glasses comprising in combination:
    a set of eye frames;
    a set of temple pieces;
    a first eye frame, selected from the set of eye frames;
    a second eye frame, selected from the set of eye frames;
    a frame temple piece selected from the set of temple pieces;
    a second temple piece selected from the set of temple pieces; and
    means for combining the first eye frame, the second eye frame, the first temple piece and the second temple piece such that the first eye frame may be used for either the user's right or left eye and the second eye frame may be used for either the user's right or left eye, the first temple piece may be used for either the user's right or left ear and the second temple piece may be used for either the user's right or left ear.

2. The user reconfigurable novelty glasses of claim 1 in which:
    the first eye frame is a three dimensional representation of a first recognizable object;
    the second eye frame is a three dimensional representation of a second recognizable object;
    the first temple piece is a three dimensional representation of a third recognizable object;
    the second temple piece is a three dimensional representation of a fourth recognizable object; and
    the first, second, third and fourth objects are each different from the others.

3. The user reconfigurable novelty glasses of claim 1 in which the means for combining provides a bridge for the user's nose.

4. The user reconfigurable novelty glasses of claim 1 including:
    a pair of tinted lenses;
    the first frame surrounding one of the lenses on at least one side; and
    the second eye frame surrounding the other of the lenses on at least one side.

* * * * *